United States Patent
Leventhal (10) Patent No.: US 9,120,034 B1
(45) Date of Patent: Sep. 1, 2015

(54) SELF-ADJUSTING GRAVITY SEPARATOR AND A METHOD OF USING

(76) Inventor: Stephen Richard Leventhal, Ashton, MD (US)

(*) Notice: Subject to any disclaimer, the term of this patent is extended or adjusted under 35 U.S.C. 154(b) by 0 days.

(21) Appl. No.: 13/332,014

(22) Filed: Dec. 20, 2011

Related U.S. Application Data (60) Provisional application No. 61/429,506, filed on Jan. 4, 2011.

(51) Int. Cl.
*B01D 17/02* (2006.01)
*E02B 15/04* (2006.01)

(52) U.S. Cl.
CPC *B01D 17/02* (2013.01); *E02B 15/04* (2013.01)

(58) Field of Classification Search
CPC ...................................................... B01D 17/02
See application file for complete search history.

(56) References Cited

U.S. PATENT DOCUMENTS

| | | | |
|---|---|---|---|
| 3,635,032 A | 1/1972 | Desty et al. | |
| 4,301,008 A | 11/1981 | Baffert | |
| 4,405,458 A | 9/1983 | McHugh | |
| 4,554,070 A | 11/1985 | Jordan | |
| 4,663,037 A * | 5/1987 | Breslin | 210/170.07 |
| 4,746,424 A | 5/1988 | Drew | |
| 4,802,592 A | 2/1989 | Wessels | |
| 4,892,666 A | 1/1990 | Paulson | |
| 4,998,585 A * | 3/1991 | Newcomer et al. | 166/105 |
| 5,043,065 A | 8/1991 | Propp | |
| 5,143,605 A | 9/1992 | Sasciarelli | |
| 5,217,611 A | 6/1993 | Ayroldi | |
| 5,445,744 A | 8/1995 | Pettersen | |
| 5,478,483 A | 12/1995 | Gore | |
| 5,498,348 A | 3/1996 | Plink | |
| 5,888,406 A | 3/1999 | Hnatiuk | |
| 6,063,274 A | 5/2000 | Rivera | |
| 6,277,287 B1 | 8/2001 | Terrien | |
| 6,315,131 B1 | 11/2001 | Terrien et al. | |
| 6,712,958 B2 | 3/2004 | Djelouah | |
| 7,125,200 B1 * | 10/2006 | Fulton | 405/96 |
| 7,357,860 B1 | 4/2008 | Painter | |
| 7,504,037 B2 * | 3/2009 | Gibbs | 210/776 |
| 7,767,085 B2 | 8/2010 | Urquhart | |
| 7,807,051 B2 | 10/2010 | Jack et al. | |
| 7,967,982 B2 | 6/2011 | Kampers | |
| 2008/0011668 A1 * | 1/2008 | Doyle et al. | 210/435 |
| 2008/0251463 A1 * | 10/2008 | Kampers | 210/709 |

OTHER PUBLICATIONS

Reade Advanced Materials website. "Weight Per Cubic Foot and Specific Gravity". http://www.reade.com/Particle_Briefings/spec_gra2.html. 2006.*

* cited by examiner

*Primary Examiner* — Tony G Soohoo
*Assistant Examiner* — Peter Keyworth
(74) *Attorney, Agent, or Firm* — Ernesto Garcia (57) ABSTRACT

A method of and a device for separating oil from water, or a lighter fluid floating on a heavier fluid or denser fluid. The device includes floating arms in V-shape formation that gather the fluids into a collecting channel which device thickens the layer of the lighter fluid to separate the lighter fluid using a drain where a self-adjusting float sits above the heavier fluid and below the lighter fluid. The lighter fluid is gravity discharged through a conduit into container to be later pumped out from the container or directly pumped from the drain.

14 Claims, 6 Drawing Sheets

SELF-ADJUSTING GRAVITY SEPARATOR AND A METHOD OF USING

PRIORITY INFORMATION

The present invention claims priority from U.S. Provisional Application Ser. No. 61/429,506 filed, Jan. 4, 2011

BACKGROUND OF THE INVENTION

1. Field of Invention

The present invention is directed to the separation of two insoluble fluids of different specific gravities. In particular, the invention is directed to an apparatus and a method of separating fluids using gravity as an inexpensive cost effective solution.

2. Description of Related Art

Several types of systems have been developed for efficient separation of oil from water. These include booms and various types of skimmers such as belt skimmers, drum or barrel skimmers, tube skimmers, and suction skimmers such as those disclosed in U.S. Pat. No. 6,277,287. The separation systems vary and include the following: weir separators, gravity separators, coalescing separators and oleophilic such as those disclosed in U.S. Pat. No. 5,217,611.

Booms help concentrate oil into thicker surface layers so that other collection methods can be used more effectively. They come in many shapes and sizes, with various levels of effectiveness in different types of water conditions. U.S. Pat. No. 3,635,032 discloses two floating arms, which form a V-shape configuration however the arms are not connected to a bottomless opened channel.

Weir skimmers function as dams allowing the oil floating on top of the water to flow over the dam and be trapped in a well inside. Typically, the trapped oil and water can then be pumped out through a pile or hose. Typically, in weir skimming devices, the weir is buoyant to float beneath the level of the liquid causing the liquid to move over the weir and then only the top layer of the liquid including the lighter fluid passes over the weir. U.S. Pat. No. 7,357,860 discloses a floating weir, which utilizes an air-filled float having buoyancy such that the weir is at or above liquid level. U.S. Pat. No. 6,063,274 discloses a self-adjusting skimmer having a buoyant body maintaining an apparatus at water surface level. U.S. Pat. No. 7,767,085 discloses a skimmer with an internal float. While the inventor in U.S. Pat. No. 6,063,274 discloses a skimmer comprising a buoyant body.

Similar concepts are used for pool skimmers in order to remove debris from the water surface as disclosed in U.S. Pat. No. 4,746,424 and U.S. Pat. No. 5,143,605.

U.S. Pat. No. 7,807,051 teaches a flexible sleeve connected to a float. This patent further teaches using a round float and does not go into details of the float to use gravity to collect oil. Furthermore, this reference collects both oil and water, and fails to make the float from paraffin.

A key factor in the efficient use of gravity separators that utilize an outlet for discharge of the lighter fluid, is maintaining a certain height or level of the fluid to keep the interface between the two different fluids at a certain distance below the lighter fluid discharge outlet. An issue in using gravity separators in open waters is maintaining a sufficient level so that water level or heavier fluid does not rise above the discharge outlet for the oil or lighter fluid. There are several methods and apparatus that attempt to overcome the problem. U.S. Pat. No. 5,498,348 discloses a valve that controls flow of liquid into the vessel so as to maintain the separating apparatus near the surface of the body of liquid. U.S. Pat. No. 6,315,131 discloses a separate discharge port for heavier water in order to maintain fluid levels.

The present invention overcomes problems with prior art devices and methods by providing an efficient, cost effective, and uncomplicated device and a method for separating insoluble fluids such as separating oil from water in open waters.

BRIEF SUMMARY OF THE INVENTION

It is an objective of the present invention to provide an apparatus for separating two insoluble fluids of differing specific gravities where the apparatus is easy to operate and is able to operate in open waters. The invention envisions using a narrow, bottomless catchment used to thicken the lighter fluid on top of a heavier fluid to facilitate recovery of the lighter fluid.

It is also an objective of the present invention to provide a self-adjusting gravity separator for separating a mixture of two insoluble fluids, such as oil and water having different densities, collected through a narrowing cavity, a drain, and a discharge tube.

It is yet another objective of present invention to provide an apparatus that includes a drain that is made of a substance having a density lighter or nearly equal to the specific gravity of water or a heavier fluid thus allowing the drain to float slightly above the water surface or denser fluid.

It is yet another objective of the present invention to use the drain in conjunction with a narrowing catchment having a cavity, where the cavity acts as an oil consolidation system, which thickens the layer of oil at the water surface in a channel. In one embodiment of the channel, the channel contains a back wall that contains an opening. In another embodiment of the channel, its back wall has no opening.

Another objective of the present invention is to provide a self-adjusting drain attached to a catchment adjacent to the narrowing cavity allowing the drain to move in conjunction with the narrowing cavity thereby allowing oil or another water insoluble fluid, having a specific gravity less than water, to be discharged through the drain then collected into a nearby container either separate from a ship or integrated as part of a ship. The fluid can be collected in the container by any means, such as, but not limited to, siphoning, pumping, skimming, adhesion skimmers, draining, or combinations thereof. It is contemplated that a means for moving the fluid through the cavity can be implemented, by pushing or pulling the catchment with a naval vehicle, or moving the fluids through the catchment with machinery, or a combination of the two motions. The catchment can also be self-propelled.

DETAILED DESCRIPTION OF THE INVENTION

Figure 1:
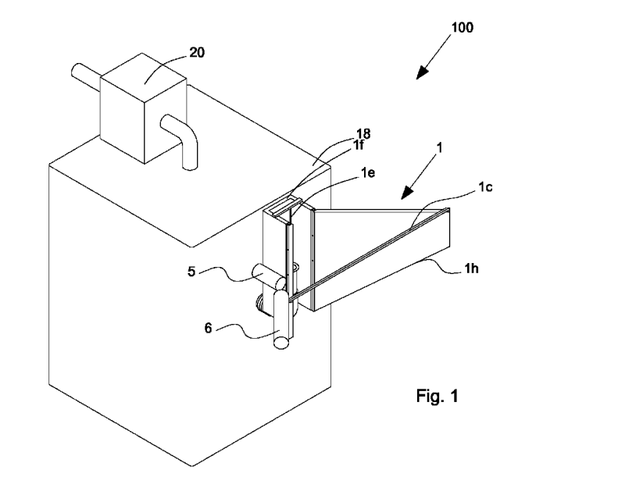
FIG. 1 is an isometric view of a first embodiment of a separating system.
Figure 2:
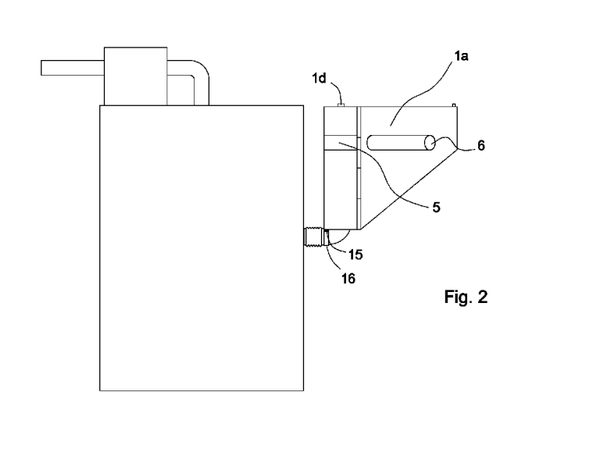
FIG. 2 shows a side view of the separating system.
Figure 3:
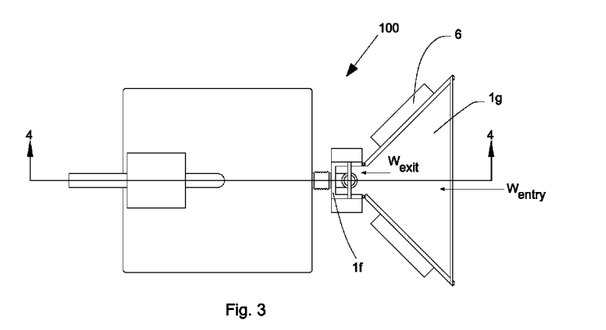
FIG. 3 is a top view of the separating system the self-adjusting drain in various titled positions of the present invention.
Figure 4:
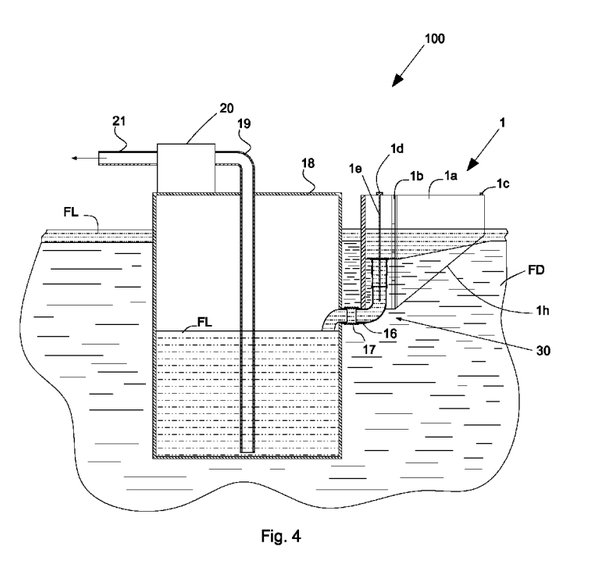
FIG. 4 is a cross-sectional view of FIG. 3 at 4-4.
Figure 8:
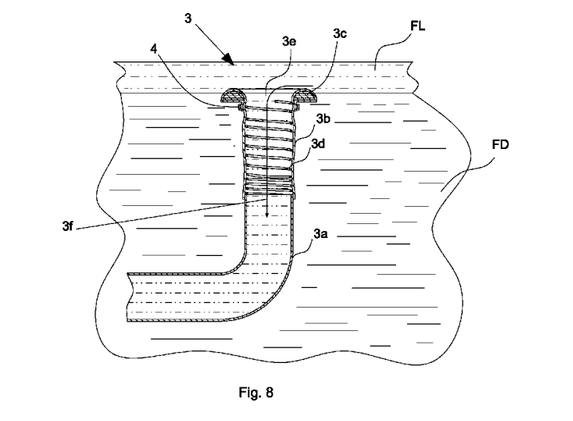
FIG. 8 is a cross-sectional view of the drain shown in FIG. 7 at section 7-7 and FIG. 5.

FIGS. 1 and 4 shows an oil collecting system 100 including a catchment 1, a container 18, a pump 20, collecting conduit 19, and an exit conduit 21. As seen in FIGS. 1 and 2, the catchment 1 comprises a U-shaped channel 1f with a pair of arms 1a connected with hinges 1b, see FIG. 4. The arms 1a contain a tapered edge 1h decreasing its height from the u-shaped channel 1f to a front portion of the arms 1a. The arms 1a remain fixedly open to a cross brace 1c being connected between the arms 1a. See FIGS. 1 and 3. As seen in FIGS. 2 and 4, the drain 30 is attached to the channel 1f using a u-shaped bracket 16 and fasteners 15. The drain 30 includes a first conduit 3a and a second conduit 3b as shown in FIG. 8. The second conduit 3b is fixed to the first conduit 3a via any method known. The second conduit 3b then connects to a float 3c, which is partially submerged in the water, preferably 51-99% of its volume. The second conduit 3b as seen in FIGS. 4, 5, 8 and 9 is made from a flexible material so that the second conduit rises to the water level FD and below the oil FL collected. The rising of the second conduit 3b is caused by the float 3c thus placing the top surface of the float above the surface of the water FD. The float 3c contains an opening 3e so that oil FL passes therein due to gravity. According to FIG. 8, the oil FL will flow according to the direction 3f and be collected in the container 18 to be pumped out through the collecting conduit 19 via the pump 20 fixed on the container 18 and exiting through exit conduit 21.

The invention contemplates using a method for collecting oil from water. When fluids FL, FD pass through the arms 1a, the fluids FL, FD are gathered at the channel 1f, the speed of the fluids changes due to the changing width of the cavity 1g, FIG. 3, formed between the arms 1a. As the width of the cavity 1g decreases, the fluid speed increases. Since the channel 1f is opened at the bottom, the speeds of the fluids will increase less than as compared if the bottom was closed. The oil FL will increase in thickness and depress the level of the water as the water flows out the bottom of the channel 1f. It is assumed, of course, that the fluids are not forced into the channel 1f at a rate so great that the water cannot pass out of the channel 1f before there is overflow or backup. Assuming no overflow or backup, the fluids can leave the channel 1f either at a rear end or through the open bottom of the channel 1f.

Figure 6:
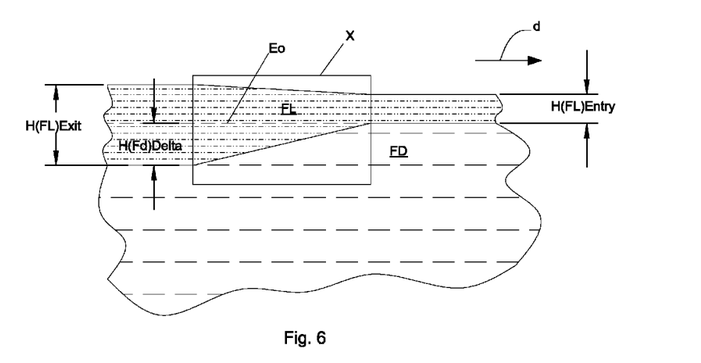
FIG. 6 is a close up view of the mechanics of the collected oil over water.

As seen in FIG. 6, if the conditions are assumed with zero impedance of fluids escaping through the bottom of the channel 1f, then assuming that the channel walls extends sufficiently far into the denser fluid, FD, there will be no increase in the speed of the denser fluid entering and an leaving through the bottom of the channel 1f. At the same time, the lighter fluid FL, will collect in an ever thickening layer as it passes through the arms 1a. The weight of this thickening layer of FL within the cavity 1g will depress level of fluid FD, within the channel to outside of the channel, essentially reaching an equilibrium point where the weight of the total fluid columns are equal inside and outside of the channel 1f. In an ideal situation, the velocity of fluid FL would not increase because the depression of the fluid FD would provide an increased cross-section essentially equal to that of the entering fluid FL.

Also, depending upon the speed at which the fluids are introduced to the catchment, one could generate a wave or wave crest in one or both of the fluids as well as increased turbulence, which could affect flow rates and could result in dispersal of one fluid in the other, both of which would be counter productive. One skilled in the art will understand that to minimize waves one will adjust the speed of the catchment based on conditions of the fluids.

Whatever the actual shape of the channel and the bottom exit way, the goal is to force fluids into the channel and the cavity at a rate which will not cause an overflow or backup, and which will permit the denser fluid, FD, to escape out the bottom of the channel, minimizing to the extent possible, the increase in velocity of either fluid.

In an ideal case, as shown in FIGS. 3 and 6, the mechanics of the fluid can be explained by a side view of the fluids entering a hypothetical cavity 1g at velocity $V_{entry}$, no surface wave, with no impedance to FD flowing out the bottom of the channel 1f, no turbulence, and no wave or wave crest formation where:

$W_{entry}$=the width of the cavity as the fluids enter,
$W_{exit}$=the width of the cavity as the fluids exit,
$E_0$=base elevation of denser fluid, $F_D$, in the environment and entering the cavity,
$H_{FLentry}$=the depth (or height) of $F_L$ on top of $F_D$ as the fluids enter the cavity,
$H_{FLexit}$=the depth (or height) of $F_L$ on top of $F_D$ as the fluids exit the cavity,
$H_{FDdelta}$=the change in elevation of the surface of $F_D$ as a consequence of the change in depth of $F_L$,
Ventry=velocity of fluids entering the cavity,
Vexit=velocity of fluids exiting the cavity, Under the conditions shown in FIG. 6, $$V\text{entry}=V\text{exit},$$

and $$H_{FLentry} \times W_{entry} = H_{FLexit} \times W_{exit},$$

or $$H_{FLexit}=(H_{FLentry} \times W_{entry})/W_{exit}$$

the depression of $F_D$ below $E_0$ is $$H_{FDdelta}=(H_{FLexit}-H_{FLentry}) \times (S_{FL}/S_{FD})$$

where
$S_{FL}$=Specific Gravity of $F_L$, and
$S_{FD}$=Specific Gravity of $F_D$.

So, a narrow, bottomless channel, in the absence excessive turbulence so that laminar flow can be maintained, can be used to increase the head (thickness or depth of the lighter, upper layer of fluid. If $H_{FLexit}$ is thick enough, the fluid $F_L$ can be removed by a variety of methods, such as siphoning, pumping, skimming or adhesion skimmers from the top out of a bottomless channel 1f attached to the narrow end of the cavity 1g. These methods are well known.

$F_L$ can also be removed by draining from the bottom in a passive mode. In this case, the drain is in the catchment and set to float or otherwise remain just at or above the level of $F_D$ so that $F_L$ can drain into a vessel attached to the drain. As shown in FIG. 6, box x represent the wings 1a of the catchment thus gathering fluids FD, FL.

The top of the drain should float on $F_D$, in and at the bottom of $F_L$, such that $F_L$ can flow into the drain mixed with a minimum or no $F_D$. To accomplish this goal, the top of the drain must be able to move up and down with the level of $F_D$ and staying substantially parallel with the surface of the water FD especially during wave motion. Therefore the specific gravity of the moveable portion of the drain, $S_{drain}$, must be less than $S_{FD}$ and greater that $S_{FL}$, or $$S_{FL} < S_{drain} < S_{FD}.$$

Figure 11:
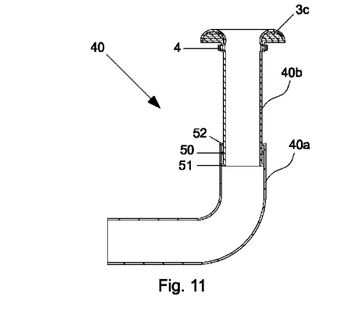
FIG. 11 shows a variation of another drain in cross-section.
Figure 12:
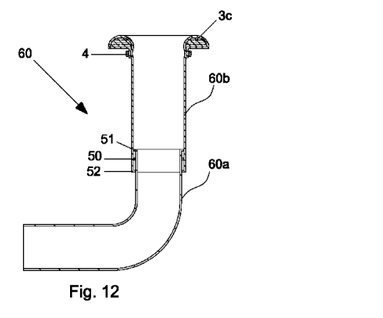
FIG. 12 shows another variation of the drain in cross-section.

This can be accomplished by any means, including, but not limited to the following: having the top of the second conduit 30b, 60b slide in and out of (or around) the first conduit 30a, 60a the drain, with or without an intermediate seal 50 between the two (FIGS. 11, 12), or having the top of the drain connected to the bottom of the drain with a flexible sleeve 3b, such as a cloth sleeve kept from collapsing by a coil of wire 3d or plastic or other material in the form of a large "slinky" toy (FIGS. 5 and 8) or supported by rings 301 or other technique to prevent collapse or blockage, all so that top of the drain can move up and down to stay on top of FD and at the bottom of FD. Whether or not specifically set forth above, the bottom of the drain is attached to the collecting container 18 and the top of the drain can move up and down with the level of $F_D$.

It is contemplated that the channel 1f and the arms 1a contain floating devices 5, 6 to keep them afloat the water FD as seen in FIGS. 1, 2, and 4. The floating devices 5, 6 are attached to the channel 1f and the arms 1a in any fashion according to those skilled in the art. As seen in FIG. 4, a beam 1d connects across a top portion of the channel 1f so that a guide 1e projects therefrom into the drain 3. The guide 1e extends so that it remains in the first conduit 3a and the second conduit 3b slides along the guide 1e thus limiting the freedom of motion of the second conduit 3b and the float 3c with respect to the top surface of the water FD and preventing the float 3c from flipping over. The guide 1e comprises a rod made from any material and can project from any part of the channel 1f.

The second conduit 3b is made from any flexible material. One end of the second conduit 3b is connected to the first conduit 3a via any connecting means. The means will include tape, adhesive, fasteners, stitching, external rings, clamps, strings, ties, sleeves, or vulcanizing. The other end of the second conduit 3b is connected to the float 3c either partially covering the float 3c or wrapping the float 3c entirely. If the flexible material is wrapped around the float 3c, a tie 4 will hold the wrap. It should be contemplated that the second conduit alternatively can be fixed to the float 3c by any known connecting means instead using a tie 4, or using a combination of connecting means.

Figure 7:
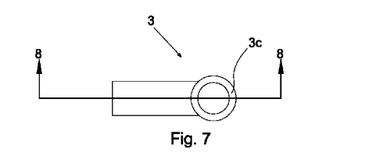
FIG. 7 is a top view of a variation of a drain.
Figure 9:
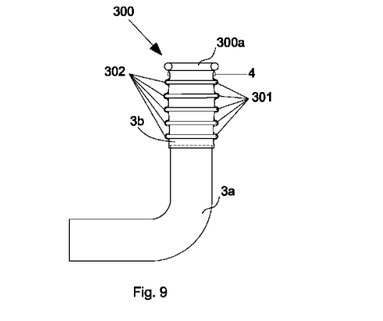
FIG. 9 is a side view showing a further variation of the drain.
Figure 10A:
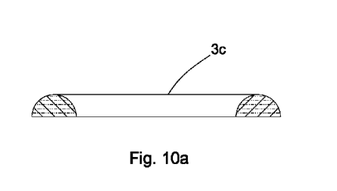
FIGS. 10a-10f show cross-sectional variations of the float of the drain.
Figure 10B:
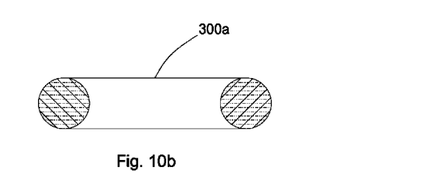
Figure 10C:
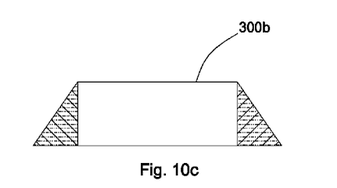
Figure 10D:
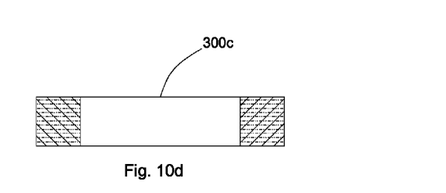
Figure 10E:
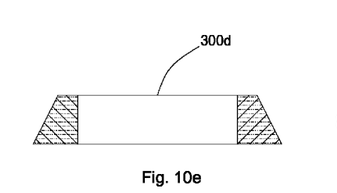
Figure 10F:
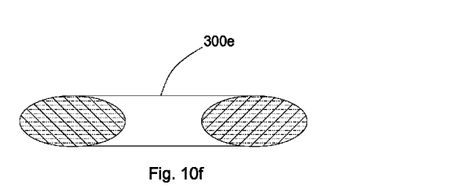

FIG. 9 shows an embodiment of the drain 300. Here, the second conduit 3b is structurally supported using axially spaced rings 301 either located outside or inside the second conduit. The rings 301 are taped or retained using stitched cloth 302. In the drain 3 shown in FIG. 7, a coil spring or slinky 3d is used to give structural support to the second conduit 3b and is connected to the second conduit 3b again by any connecting means. It will be preferable to keep the coil spring or slinky 3d inside the second conduit so that the second conduit does not collapse by the water. In the even that the coil spring or slinky 3d is outside, the connecting means should be strong to prevent the second conduit from collapsing.

In FIGS. 4, 5, 7, 8, 10a 11, and 12, the float 3c is shown as being a half of a torus in cross-section and submerged in water. Of course, the cross-section of the float can be varied to take other shapes such as a complete torus shape 300a, a revolving triangular shape 300b, a revolving square shape 300c, a revolving trapezoidal shape 300d, a revolving oval shape 300e, or any other shape forming a closed wall with an axial opening extending through.

Figure 5:
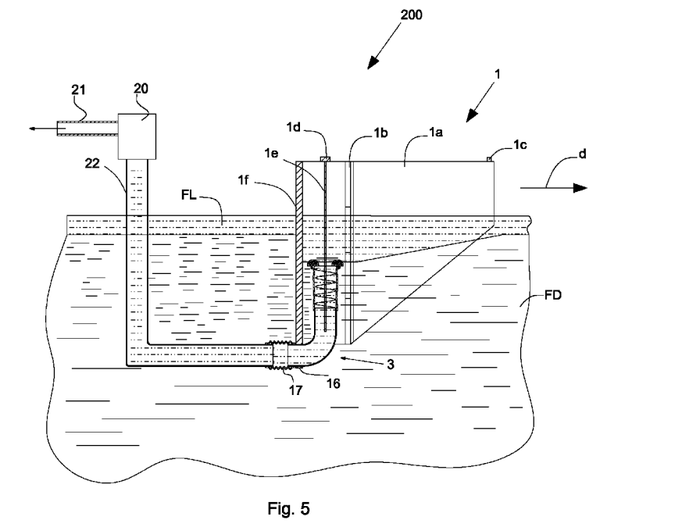
FIG. 5 is a cross-sectional view of another separating system.

FIG. 5 shows an alternative collecting system 200 having no container 18. Here, the pump 20 is directly connected to the drain 3 via a collecting conduit 22, which is connected to a flexible sleeve 17. The flexible sleeve 17 is then connected to the first conduit 3a via any connecting means. It should be distinguished that the drain in system 200 contains a structural support in the drain 3 for preventing the second conduit 3b from collapsing while the system 100, shown in FIG. 4, the drain 30 has no structural support on the second conduit. The drains 40 and 60, respectively shown in FIGS. 11 and 12, contains an external flange 51 in the second conduit 40b and the first conduit, respectively 60a, while an internal flange 52 is in the first conduit 40a and the second conduit 60b respectively. These internal flanges 52 and external flanges 51 are utilized to keep the seal 50 between the first conduit and the second conduit. It is contemplated that the first conduit 40a, 60a and the second conduit 40a, 60b, are made from flexible material or plastic or similar to the other conduits as shown in FIGS. 4, 8, and 9. In all embodiments, the first conduit 3a, 40a, 60a, can be made from flexible material or a rigid material.

Figure 13:
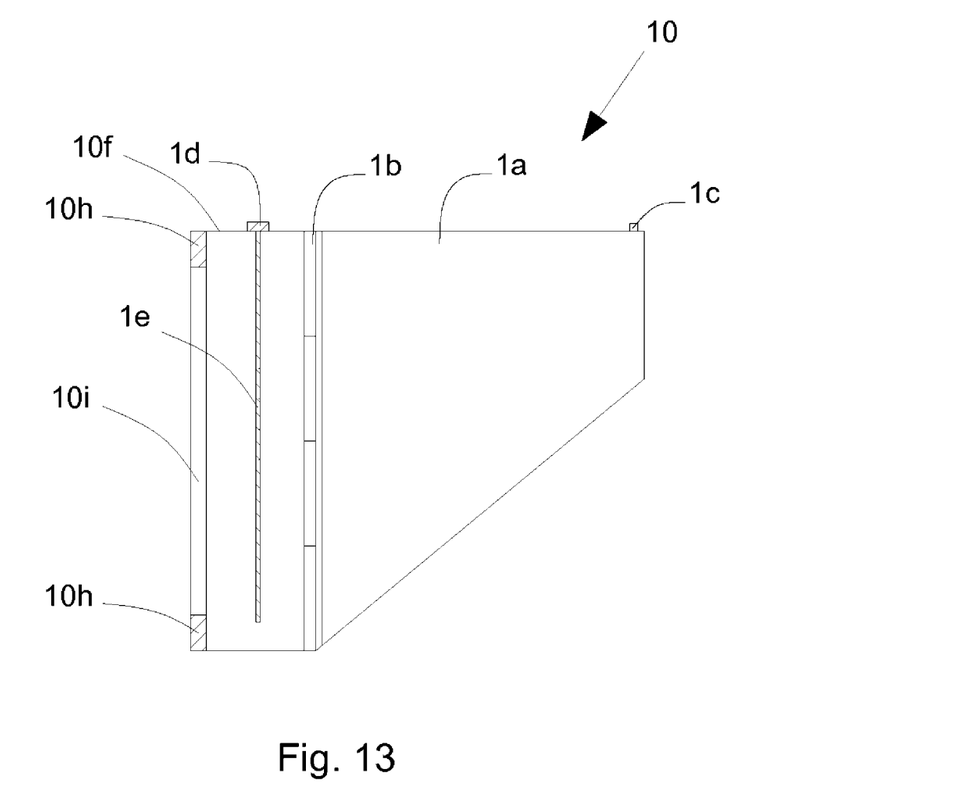
FIG. 13 shows another variation of the catchment in cross-section.

FIGS. 1-5 shows the catchment 1 with a channel 1f, which has a closed back wall. While the channel 1f has been show being u-shaped, the channel 1f can have any other channel shape such as being round, hexagonal, or with a different curve pattern. Further, while the channel 1f shown in FIG. 1-5 is closed on its back, the channel 1f can be opened as implemented in catchment 10 in FIG. 13. Here, the channel 10f has a back opening 10i delimited by two cross braces 10h to give structural strength and allow the bracket 16 to be mounted on one of the two braces 10h.

While the design requirement of the float is to keep the top surface of the float 3c above water or sandwiched between the oil and the water, the best material to use is a wax material such as paraffin. Wax generally has a specific gravity of 0.93-0.96 while paraffin is 0.95. Oil has a specific gravity of approximately 0.9. The other design consideration is to keep the float sunken in water such that 51%-99% of its volume is under water. Of course, the drain could be made of Styrofoam as a hollow tube properly bottom weighted with ballast to have a net specific gravity in the proper range of the fluids being separated.

While the drain 3 in FIG. 8 has been shown to appear stationary, the drain 3 is to be moving with the catchment 1. The drain 3 is not limited to be moving in direction d in open waters. The drain 3 can be utilized by itself in a stationery fashion. The system 100, 200 could be used with tugboats such that one pulls on the containment 1 in open waters or pushes on the containment 1. Alternatively, the system can be integrated with a boat, ship, barge, or be self-propelled. For instance, the container 18 can be part of the boat, ship, or barge. It is contemplated that the sizes of the features can be varied to fit any condition. While the second conduit 3b is to be made of flexible material or cloth, there's no limited restriction as to the flexible material or cloth used. These materials can vary from latex, rubber, or synthetic fibers. Further, while water cannot be completely avoided in the container 18, a separate pump can be implemented to the container 18 in case any water has been collected. The pump 20, although being shown sitting on top of the container 18 in FIG. 4, the container can be in any location or be located in a tugboat, ship, barge, or any naval vessel.

It is contemplated that the term water is not be limited to salt water but can be fresh or brackish water, each with a higher specific gravity than oil. While the invention is contemplated to solve oil spills the invention can function on the oceans of Saturn moons or Jupiter moons where one could be dealing with the specific gravity of liquid methane or other organic compounds, and another substance.

The invention claimed is:

1. A device comprising a drain including a first conduit and a second conduit; the first conduit being fixedly connected to the second conduit at a first end of the second conduit; wherein the second conduit connecting to a float at a second end of the second conduit; whereby the top of the float remains above the surface of a heavier fluid and below a surface of the lighter fluid allowing the lighter fluid to pass through the float;
  the device further comprising a catchment comprising a channel opened at a bottom and a side forming a cavity; the drain being mounted at the bottom of the channel and located inside the cavity; and, wherein a guide projects from the catchment into the float and the second conduit.

2. The device of claim 1, wherein the float comprises paraffin.

3. The device of claim 1, wherein the second conduit comprising a flexible material.

4. The device of claim 3, wherein the float comprises paraffin.

5. The device of claim 1, wherein the catchment further comprising a pair of arms pivotally connected to the channel and a brace interconnecting both of the arms.

6. The device of claim 5, wherein the channel and the pair of arms has a floating device.

7. A device comprising a drain including a first conduit and a second conduit; the first conduit being fixedly connected to the second conduit at a first end of the second conduit; wherein the second conduit connecting to a float at a second end of the second conduit; whereby the top of the float remains above the surface of a heavier fluid and below a surface of the lighter fluid allowing the lighter fluid to pass through the float; wherein the second conduit comprises a flexible material; and,
  wherein the flexible material is passing through the float and wrapping around the float.

8. The device of claim 7, wherein the second conduit further includes a collapsible coil either housed in the second conduit or residing outside the conduit.

9. The device of claim 7, wherein axially spaced rings being attached to the second conduit.

10. The device of claim 7, wherein the float comprises paraffin.

11. The device of claim 7, further comprising a catchment comprising a channel opened at a bottom and a side forming a cavity; the drain being mounted at the bottom of the channel and located inside the cavity.

12. The device of claim 11, wherein the channel contains a back wall having an opening or no opening.

13. The device of claim 11, further including a container attached to the drain.

14. The device of claim 13, further including a pump connected to the container to remove the lighter fluid from the container.

* * * * *